W. H. CLARK AND G. B. PRETTYMAN.
FASTENING DEVICE.
APPLICATION FILED SEPT. 19, 1918.
1,326,846.
Patented Dec. 30, 1919.
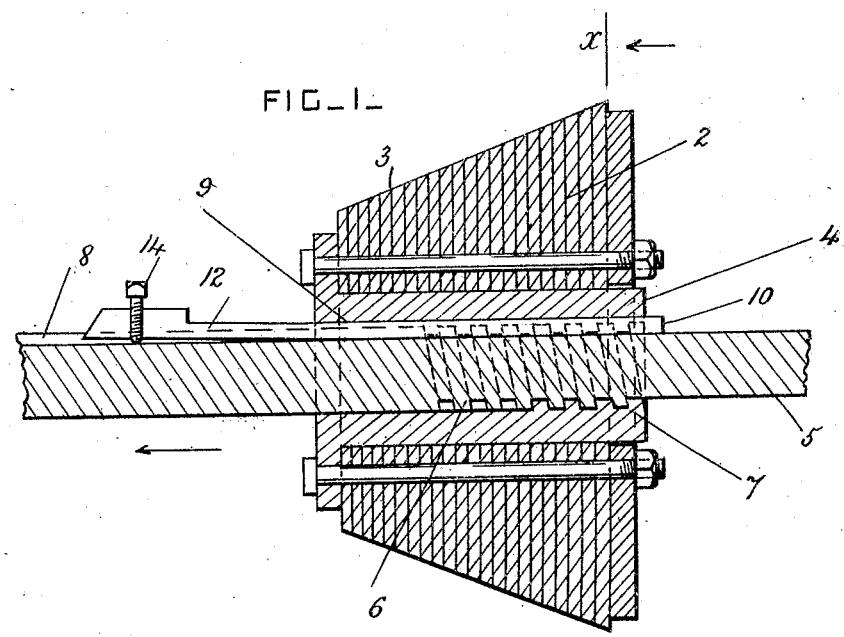
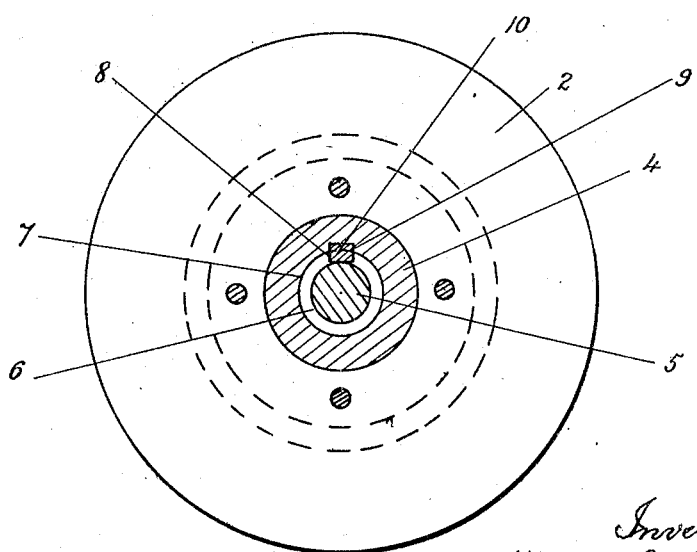
Inventors
William H. Clark, and
George B. Prettyman
by Herbert W. T. Jenner
Attorney

UNITED STATES PATENT OFFICE.

WILLIAM H. CLARK AND GEORGE B. PRETTYMAN, OF SPRINGFIELD, OREGON.

FASTENING DEVICE.

1,326,846.   Specification of Letters Patent.   Patented Dec. 30, 1919.

Application filed September 19, 1918. Serial No. 254,720.

*To all whom it may concern:*

Be it known that we, WILLIAM H. CLARK and GEORGE B. PRETTYMAN, citizens of the United States, residing at Springfield, in the county of Lane and State of Oregon, have invented certain new and useful Improvements in Fastening Devices, of which the following is a specification.

This invention relates to devices for securing friction wheels and other similar machine elements to shafts; and it consists in the novel construction and combination of the parts hereinafter fully described and claimed.

In the drawings, Figure 1 is a longitudinal section through a friction wheel provided with a fastening device according to this invention. Fig. 2 is a cross-section taken on the line $x$—$x$ in Fig. 1.

The friction wheel 2 is provided with a beveled face 3, and it has a hub portion 4 which is mounted to revolve with the shaft 5.

The friction wheel is of any approved construction which will not be liable to slip, and the fastening devices which connect its hub to the shaft may be used to connect the hubs of other machine elements to their shafts.

The shaft 5 is provided with a screwthreaded portion 6, and the hub portion is provided with a screw threaded portion 7 which engages with the screw-threaded portion 6. The screwthreaded portion of the shaft is preferably longer than that of the hub, and the screwthreaded portion of the hub extends only partway through it, the remaining part being counterbored so that it will slide on the tops of the screwthreads of the shaft.

A keyway 8 is cut longitudinally in the shaft, and a similar keyway 9 is cut in the hub portion of the friction wheel. A key 10 is arranged to slide in the two keyways, and it has an end portion 12 which projects beyond the friction wheel. This key is made to fit nicely in the keyways and without being a hard driving fit.

A set-screw 14 is screwed into the end portion 12 of the key, and bears against the shaft 5. When the set-screw is tightened up it locks the key securely in place so that it cannot come out, by springing it slightly so that it bears hard on the shaft and friction wheel.

When the face of the beveled friction wheel becomes worn, the key is unlocked from the shaft, and is drawn out, and the friction wheel is then turned around on the screwthreaded portion of the shaft so that it is moved longitudinally of the shaft in the direction of the arrow in Fig. 1. When the keyways again come together the key is replaced. A finer adjustment can be had by providing additional keyways. When a single keyway in each part is provided, the friction wheel is turned around one revolution to effect the smallest adjustment.

The cylindrical portion of the hole in the hub forms a guide which slides on the cylindrical portion of the shaft and holds the friction wheel truly in position, and permits the screwthreaded portions to engage loosely with each other so that the hub is easily adjusted.

What we claim is:

In a fastening device, a shaft provided with a cylindrical portion and a screwthreaded portion and having also a keyway in said portions, a machine element having a hub provided with a cylindrical guiding portion and a screwthreaded portion which engage with the corresponding portions of the said shaft, the screwthreaded portion of the hub being shorter than the screwthreaded portion of the shaft, said hub being also provided with a keyway, a key normally freely slidable in the said keyways and having an outer end portion which projects from the said hub, and a set-screw engaging with the outer end portion of the key and bearing against the shaft and operating to spring the outer end portion of the key away from the shaft and thereby lock the key in the keyways.

In testimony whereof we affix our signatures.

WILLIAM H. CLARK.
GEORGE B. PRETTYMAN.